(12) United States Patent
Sugihara et al.

(10) Patent No.: US 10,196,489 B2
(45) Date of Patent: Feb. 5, 2019

(54) AQUEOUS DISPERSION OF POLYESTER-TYPE ELASTIC MATERIAL, AND METHOD FOR PRODUCING SAME

(71) Applicant: SUMITOMO SEIKA CHEMICALS CO., LTD., Kako-gun, Hyogo (JP)

(72) Inventors: Norihiro Sugihara, Himeji (JP);
Hiromasa Miyazaki, Himeji (JP);
Toshiaki Fujiwara, Himeji (JP);
Hidetoshi Sakai, Nagoya (JP); Yosuke Yamada, Nagoya (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 0 days.

(21) Appl. No.: 15/523,167

(22) PCT Filed: Oct. 28, 2015

(86) PCT No.: PCT/JP2015/080435
§ 371 (c)(1),
(2) Date: Apr. 28, 2017

(87) PCT Pub. No.: WO2016/068206
PCT Pub. Date: May 6, 2016

(65) Prior Publication Data
US 2017/0321017 A1    Nov. 9, 2017

(30) Foreign Application Priority Data

Oct. 29, 2014   (JP) ................................. 2014-220661

(51) Int. Cl.
| | |
|---|---|
| *C08L 67/02* | (2006.01) |
| *C08J 3/03* | (2006.01) |
| *C08J 3/05* | (2006.01) |
| *C08K 5/54* | (2006.01) |
| *C08L 29/04* | (2006.01) |
| *C08L 67/00* | (2006.01) |
| *C08L 71/02* | (2006.01) |
| *C09D 129/04* | (2006.01) |
| *D06M 15/507* | (2006.01) |

(52) U.S. Cl.
CPC . *C08J 3/03* (2013.01); *C08J 3/05* (2013.01);
*C08K 5/54* (2013.01); *C08L 29/04* (2013.01);
*C08L 67/00* (2013.01); *C08L 67/02* (2013.01);
*C08L 71/02* (2013.01); *C09D 129/04* (2013.01); *D06M 15/507* (2013.01)

(58) Field of Classification Search
USPC .......................................................... 525/165
See application file for complete search history.

(56) References Cited

U.S. PATENT DOCUMENTS

| | | |
|---|---|---|
| 2006/0069231 A1 | 3/2006 | Kajimaru et al. |
| 2014/0349113 A1 | 11/2014 | Saito et al. |

FOREIGN PATENT DOCUMENTS

| | | |
|---|---|---|
| EP | 0794212 A1 | 9/1997 |
| JP | 51-23532 A | 2/1976 |
| JP | S51-23532 A | 2/1976 |
| JP | 2001-106808 A | 4/2001 |
| JP | 2001-310944 A | 11/2001 |
| JP | 2003-253102 A | 9/2003 |
| JP | 2003-253134 A | 9/2003 |
| JP | 2011-99125 A | 5/2011 |
| WO | 2012/43510 A1 | 4/2012 |
| WO | 2012/118501 A1 | 9/2012 |
| WO | 2013/137370 A1 | 9/2013 |

OTHER PUBLICATIONS

Notification of Transmittal of Translation of the International Preliminary Report on Patentability (PCT/IB/338) issued in counterpart International Application No. PCT/JP2015/080435 dated May 11, 2017, with Forms PCT/IB/373 and PCT/ISA/237. (6 pages).
International Search Report dated Nov. 24, 2015, issued in counterpart application No. PCT/JP2015/080435. (2 pages).
Extended (supplementary) European Search Report dated May 29, 2018, issued in counterpart European Application No. 15855989.8. (7 pages).
Office Action dated Sep. 3, 2018, issued in counterpart Chinese Application No. 201580058950.2, with English machine translation. (16 pages).

*Primary Examiner* — Terressa Boykin
(74) *Attorney, Agent, or Firm* — Westerman, Hattori, Daniels & Adrian, LLP

(57) ABSTRACT

The present invention provides an aqueous dispersion of a polyester-containing elastic material, the aqueous dispersion comprising an aqueous medium, a non-ionic surface active agent and a polyester-containing elastic material, wherein the aqueous dispersion comprises 1 to 20 parts by mass of the non-ionic surface active agent relative to 100 parts by mass of the polyester-containing elastic material. The present invention also provides: a method for producing an aqueous dispersion of a polyester-containing elastic material; a molded article produced from the aqueous dispersion; and a method for producing a molded article.

9 Claims, No Drawings

AQUEOUS DISPERSION OF POLYESTER-TYPE ELASTIC MATERIAL, AND METHOD FOR PRODUCING SAME

TECHNICAL FIELD

The present invention relates to an aqueous dispersion of a macromolecular elastic material and a method for producing the aqueous dispersion thereof and, more specifically, to an aqueous dispersion of a polyester-containing elastic material and a method for producing thereof.

BACKGROUND ART

A macromolecular elastic material basically is a material that has a flexible macromolecular structure or a material that has a structure formed by combining a rigid macromolecular part and a flexible macromolecular part. This macromolecular elastic material exhibits rubber elasticity at normal temperature, is plasticized at a high temperature similarly to a thermoplastic plastic, and can therefore be mechanically molded. This macromolecular elastic material is therefore used in a wide range of industrial fields. Examples of a typical macromolecular elastic material include those of a styrene type, an olefin type, a polyester type, a polyurethane type, a polyvinyl chloride type, a polyamide type, and the like.

These macromolecular elastic materials are usually provided as molded articles each produced by a mechanical operation such as extrusion. On the other hand, preferably, the macromolecular elastic materials are used each as an aqueous dispersion when the macromolecular elastic materials are each used in a coating agent for various types of material, a gluing adhesive, a binder, a thermal fusion bonding agent, a modifying agent for an emersion and the like, a convergence agent for a fiber, or the like.

Many researches have been conducted so far on the aqueous dispersion of the macromolecular elastic material and an aqueous dispersion of a styrene-type elastic material has been provided as a practical-use article. The aqueous dispersion of the styrene-type elastic material is usually produced by mixing with each other an organic phase formed by dissolving the styrene-type elastic material into an organic solvent and an aqueous phase formed by dissolving an emulsifying agent (a surface active agent) into an aqueous medium, emulsifying the mixture liquid using a homogenizing mixer or the like, and removing thereafter the organic solvent (for example, Japanese Laid-Open Patent Publication No. 51-23532 and Japanese Laid-Open Patent Publication No. 2003-253134).

The molded article acquired from the aqueous dispersion of the styrene-type elastic material, however, is in general inferior in the wear resistance, the flex resistance, the oil resistance, and the weather resistance. In contrast, the polyester-containing elastic material not only is better in these properties but also can provide a molded article that is produced therefrom and that has better properties also for the heat resistance, the flexibility, the low temperature property, and the high mechanical strength. The polyester-containing elastic material is useful as a material to produce, for example, items in the machine and the device fields such as a hose, a belt, and a packing, car parts such as a CVJ boot and a door latch, a sealing agent for connectors and sensors, and electric & electronic parts such as a cord cover and an antenna cover.

The aqueous dispersion of the macromolecular elastic material such as the styrene-type elastic material is generally acquired using a method according to which an organic phase formed by dissolving the macromolecular elastic material into an organic solvent and an aqueous phase formed by dissolving an emulsifying agent into an aqueous medium are mixed with each other, the mixture liquid is emulsified using a homogenizing mixer or the like, and the organic solvent is thereafter removed, or a method according to which the macromolecular elastic material and an aqueous phase formed by dissolving an emulsifying agent into an aqueous medium are mixed with each other and mechanical shear is applied to the mixture at equal to or higher than the temperature of the melting point of the macromolecular elastic material to emulsify the mixture. The former, however, involves problems such as the one that the load on the environment is significant because the former uses the organic solvent. The latter also involves problems such as decomposition of the resin due to the thermal history applied to the macromolecular elastic material and occurrence of any adverse effect on the adhesiveness due to the used emulsifying agent.

PRIOR ART DOCUMENTS

Patent Documents

Patent Document 1: Japanese Laid-Open Patent Publication No. 51-23532
Patent Document 2: Japanese Laid-Open Patent Publication No. 2003-253134

SUMMARY OF THE INVENTION

Problems to be Solved by the Invention

An object of the present invention is to provide an aqueous dispersion of a polyester-containing elastic material from which a molded article can be produced that has properties of the polyester-containing elastic material, especially, a molded article that has less bleeding of any non-ionic surface active agent and that is better in the adhesiveness for various types of material.

Means for Solving Problems

The present invention provides an aqueous dispersion of a polyester-containing elastic material, that includes an aqueous medium, a non-ionic surface active agent, and a polyester-containing elastic material and that includes 1 to 20 parts by mass of the non-ionic surface active agent relative to 100 parts by mass of the polyester-containing elastic material.

The present invention provides a molded article of a polyester-containing elastic material acquired from the aqueous dispersion of a polyester-containing elastic material, that includes the aqueous medium, the non-ionic surface active agent, and the polyester-containing elastic material.

The present invention further provides a method for producing the aqueous dispersion of a polyester-containing elastic material, that includes the steps of preparing a mixture liquid of the polyester-containing elastic material, the non-ionic surface active agent, and the aqueous medium, and emulsifying the polyester-containing elastic material with setting the temperature of the acquired mixture liquid to be a temperature between a temperature lower by 40° C. than the melting point of the polyester-containing elastic material and a temperature higher by 100° C. than the melting point, wherein the method uses 1 to 20 parts by mass of the non-ionic surface active agent relative to 100 parts by mass of the polyester-containing elastic material. The present invention also provides a molded article acquired from the aqueous dispersion liquid of the polyester-containing elastic material produced according to the above method.

The present invention further provides a method for producing a molded article from the aqueous dispersion of the polyester-containing elastic material.

Effect of the Invention

The aqueous dispersion liquid of the polyester-containing elastic material of the present invention enables production of a molded article that has less bleeding of the non-ionic surface active agent and that is better in the adhesiveness for various types of material.

In the present invention, the "bleeding" means the state, for example, where the non-ionic surface active agent is separated on the surface of a coating film acquired from the aqueous dispersion of the polyester-containing elastic material and the surface looks powdery, the surface of the coating film has tackiness.

The method for producing the aqueous dispersion of a polyester-containing elastic material of the present invention includes the step of emulsifying the polyester-containing elastic material with setting the temperature of the mixture liquid to be a temperature between a temperature lower by 40° C. than the melting point of the polyester-containing elastic material and a temperature higher by 100° C. than the melting point, and thereby enables stable emulsification of the polyester-containing elastic material in the aqueous medium.

A molded article produced using the aqueous dispersion of the polyester-containing elastic material of the present invention, and a molded article acquired from the aqueous dispersion of the polyester-containing elastic material produced following the method for producing the aqueous dispersion of the polyester-containing elastic material of the present invention has less bleeding of the non-ionic surface active agent and are better in the adhesiveness.

MODES FOR CARRYING OUT THE INVENTION

An aqueous dispersion of the polyester-containing elastic material of the present invention (hereinafter, may be referred to as "aqueous dispersion of the present invention") includes an aqueous medium, a non-ionic surface active agent, and a polyester-containing elastic material.

The non-ionic surface active agent used in the aqueous dispersion of the present invention is, for example, at least one selected from the group consisting of polyvinyl alcohol, an ethylene oxide/propylene oxide copolymer, and a mixture of these. 1 to 20 parts by mass of the non-ionic surface active agent is used relative to 100 parts by mass of the polyester-containing elastic material.

The aqueous dispersion of the polyester-containing elastic material of the present invention includes, for example, a polyester block copolymer (A).

The polyester-containing elastic material used in the aqueous dispersion of the present invention further includes, for example, a polyvinyl resin(B) and/or a silane coupling agent (C) in addition to the polyester block copolymer (A), and includes 1 to 30 parts by mass of the polyvinyl resin (B) and/or 0.01 to 5.0 parts by mass of the silane coupling agent (C) relative to 100 parts by mass of the polyester block copolymer (A).

The polyester block copolymer (A) includes, for example, a hard segment (a1) and a soft segment (a2), and the hard segment (a1) includes, for example, a polybutylene terephthalate unit that is derived from terephthalic acid and/or dimethyl terephthalate, and 1,4-butanediol, and a polybutylene isophthalate unit that is derived from isophthalic acid and/or dimethyl isophthalate, and 1,4-butanediol.

In the aqueous dispersion of the present invention, particles of the polyester-containing elastic material are usually particles having the average particle diameter of, for example, 0.1 to 20 μm. The particles of the polyester-containing elastic material are, for example, spherical particles. The aqueous dispersion may include a macromolecule dispersion stabilizing agent.

Since the aqueous dispersion of the polyester-containing elastic material of the present invention includes the non-ionic surface active agent at the predetermined rate relative to the polyester-containing elastic material, a molded article that has the properties of the polyester-containing elastic material, especially, a molded article that has less bleeding of the non-ionic surface active agent and that is better in the adhesiveness for various types of material can be produced therefrom.

A method for producing the aqueous dispersion of the polyester-containing elastic material of the present invention includes the step of preparing a mixture liquid of the polyester-containing elastic material, the non-ionic surface active agent, and the aqueous medium, and the step of emulsifying the polyester-containing elastic material with setting the temperature of the acquired mixture liquid to be a temperature between a temperature lower by 40° C. than the melting point of the polyester-containing elastic material and a temperature higher by 100° C. than the melting point. The non-ionic surface active agent is used at a rate of 1 to 20 parts by mass relative to 100 parts by mass of the polyester-containing elastic material.

A molded article of the polyester-containing elastic material of the present invention is acquired from the aqueous dispersion of the polyester-containing elastic material. The molded article of the polyester-containing elastic material of the present invention can be acquired by using the aqueous dispersion acquired from the method for producing the aqueous dispersion of the polyester-containing elastic material.

The method for producing the molded article of the present invention includes the step of applying the aqueous dispersion of the polyester-containing elastic material to a base material or pouring the aqueous dispersion thereof into a mold form, and the step of drying the applied or the poured aqueous dispersion of the polyester-containing elastic material.

Other objects and other effects of the present invention will be described below in detail.

The aqueous dispersion of the polyester-containing elastic material of the present invention includes the aqueous medium, the non-ionic surface active agent, and the polyester-containing elastic material. The aqueous medium used in the present invention is not especially limited while, preferably, the aqueous medium is water. Various types of water, such as tap water, industrial water, ion-exchanged water, deionized water, and pure water, may be used, and preferably, pure water is used. Substances may properly be added to the water when necessary each within a range not to obstruct the objects of the present invention, such as a pH adjusting agent, a defoaming agent, a viscosity adjusting agent, a fungicide, a coloring agent, and an oxidation inhibitor.

The use amount of the aqueous medium is not especially limited while, preferably, the use amount thereof is set to be 10 to 1,000 parts by mass relative to 100 parts by mass of the polyester-containing elastic material and, more preferably, the use amount thereof is set to be 10 to 250 parts by mass relative thereto. The aqueous dispersion better in the dispersion stability and the like can be acquired by using the aqueous medium in the above ranges. The aqueous dispersion better further in the productivity and the practical usability can be acquired.

The polyester-containing elastic material used in the present invention is not especially limited while the polyester-containing elastic material is, for example, the polyester block copolymer (A) and is the polyester block copolymer (A) including as its main constituent components the hard segment (a1) that mainly includes, for example, an aromatic polyester unit and the soft segment (a2) that mainly includes, for example, an aliphatic polyether unit and/or an aliphatic polyester unit.

The hard segment (a1) of the polyester block copolymer (A) used in the present invention is, for example, a polyester that is formed mainly from an aromatic dicarboxylic acid or an ester-forming derivative thereof, and diol or an ester-forming derivative thereof.

Examples of the aromatic dicarboxylic acid include, for example, terephthalic acid, isophthalic acid, phthalic acid, naphthalene-2,6-dicarboxylic acid, naphthalene-2,7-dicarboxylic acid, anthracene dicarboxylic acid, diphenyl-4,4'-dicarboxylic acid, diphenoxyethane dicarboxylic acid, 4,4'-diphenylether dicarboxylic acid, 5-sulfoisophthalic acid, and sodium 3-sulfoisophthalate. In the present invention, for example, the aromatic dicarboxylic acid is mainly used while a portion of the aromatic dicarboxylic acid may be substituted with an alicyclic dicarboxylic acid such as 1,4-cyclohexane dicarboxylic acid, cyclopentane dicarboxylic acid, or 4,4'-dicyclohexyl dicarboxylic acid, and/or an aliphatic dicarboxylic acid such as adipic acid, succinic acid, oxalic acid, sebacic acid, dodecanedioic acid, or dimer acid.

The ester-forming derivative of the aromatic dicarboxylic acid such as, for example, a lower alkyl ester, an aryl ester, a carbonate ester, or an acid halide can also be used equivalently to the aromatic dicarboxylic acid.

In the present invention, preferably, two or more of the above aromatic dicarboxylic acids and/or the ester-forming derivative components thereof are used, and examples thereof include, for example, a combination of terephthalic acid and isophthalic acid, that of terephthalic acid and dodecanedioic acid, and that of terephthalic acid and dimer acid. The use of the two or more of the aromatic dicarboxylic acids and/or the ester-forming derivative components thereof can decrease the degree of crystallization and the melting point of the hard segment, can also impart the flexibility, and can improve the heat-adhesiveness for another thermoplastic resin.

Preferably, specific examples of the diol include diols whose molecular weights are each equal to or lower than 400 such as, for example, aliphatic diols such as 1,4-butanediol, ethylene glycol, trimethylene glycol, pentamethylene glycol, hexamethylene glycol, neopentyl glycol, and decamethylene glycol; alicyclic diols such as 1,1-cyclohexanedimethanol, 1,4-dicyclohexanedimethanol, and tricyclodecanedimethanol; and aromatic diols such as xylylene glycol, bis(p-hydroxy)diphenyl, bis(p-hydroxy)diphenylpropane, 2,2'-bis[4-(2-hydroxyethoxy)phenyl]propane, bis[4-(2-hydroxyethoxy)phenyl]sulfone, 1,1-bis[4-(2-hydroxyethoxy)phenyl]cyclohexane, 4,4'-dihydroxy-p-terphenyl, and 4,4'-dihydroxy-p-quarterphenyl. The diol can be used in the form of an ester-forming derivative such as, for example, an acetylated form or an alkali metal salt. Two or more of these dicarboxylic acids, the derivatives thereof, the diol components, and the derivatives thereof may be used concurrently with each other.

Preferably, examples of the hard segment (a1) include a hard segment including a polybutylene terephthalate unit that is derived from terephthalic acid and/or dimethyl terephthalate, and 1,4-butanediol, and a polybutylene isophthalate unit that is derived from isophthalic acid and/or dimethyl isophthalate, and 1,4-butanediol, and a copolymer of these two that are advantageously used. Especially preferably, a hard segment is used that includes a polybutylene terephthalate/isophthalate unit derived from terephthalic acid and/or dimethyl terephthalate, isophthalic acid and/or dimethyl isophthalate, and 1,4-butanediol.

The soft segment (a2) of the polyester block copolymer (A) used in the present invention is, for example, the aliphatic polyether unit and/or the aliphatic polyester unit.

Examples of the aliphatic polyether include, for example, poly(ethylene oxide)glycol, poly(propylene oxide)glycol, poly(tetramethylene oxide)glycol, poly(hexamethylene oxide)glycol, a copolymer of ethylene oxide and propylene oxide, an ethylene oxide addition polymer of poly(propylene oxide)glycol, and copolymer glycol of ethylene oxide and tetrahydrofuran.

Examples of the aliphatic polyester include, for example, poly(ε-caprolactone), polyenantholactone, polycaprolactone, polybutylene adipate, and polyethylene adipate.

Preferably, of these aliphatic polyether units and/or the aliphatic polyester units, the ethylene oxide addition polymer of poly(tetramethylene oxide)glycol, the ethylene oxide addition polymer of poly(propylene oxide)glycol, the copolymer glycol of ethylene oxide and tetrahydrofuran, the poly(ε-caprolactone), the polybutylene adipate, the polyethylene adipate, and the like are used from the elasticity property of the acquired polyester block copolymer and, among these, especially preferably, the ethylene oxide addition polymer of poly(tetramethylene oxide)glycol, the ethylene oxide addition polymer of poly(propylene oxide) glycol, and the copolymer glycol of ethylene oxide and tetrahydrofuran are used. Preferably, the number average molecular weights of these soft segments are about 300 to about 6,000 in their copolymerized states.

The copolymerization amount of the soft segment (a2) of the polyester block copolymer (A) used in the present invention is, for example, 20 to 95% by mass and, preferably 25 to 90% by mass relative to 100% by mass of the polyester block copolymer (A). The copolymerization ratios of (a1) and (a2) can be set in these ranges.

The melting point of the polyester block copolymer (A) used in the present invention is, for example, 105° C. to 225° C. and preferably 125° C. to 205° C.

The polyester block copolymer (A) used in the present invention can be produced using any known method and the method is not especially limited. Specific examples of the method for producing the above include, for example, a method according to which an ester exchange reaction is conducted using a lower alcohol diester of a dicarboxylic acid, an excessive amount of a glycol having a low molecular weight, and a polymer segment component having a low melting point in the presence of a catalyst, and then the acquired reaction product is poly-condensed, and a method according to which an esterification reaction is conducted using a dicarboxylic acid, an excessive amount of glycol, and a polymer segment component having a low melting point in the presence of a catalyst and then the acquired reaction product is poly-condensed, and any one of these methods may be employed.

Any commercially available polyester block copolymer is usable as the polyester block copolymer (A) used in the present invention. Examples of the commercially available polyester block copolymer include, for example, Hytrel® 3046 (the Shore D hardness=27D) produced by Du Pont-Toray Co., Ltd., Hytrel® 4057N (the Shore D hardness=40D) produced by Du Pont-Toray Co., Ltd., Hytrel® 2300X06 (the Shore D hardness=41D) produced by Du Pont-Toray Co., Ltd., and Hytrel® 4767N (the Shore D hardness=47D) produced by Du Pont-Toray Co., Ltd.

One type, or two or more types as a mixture of polyester block copolymer (A) may be used in the polyester-containing elastic material used in the present invention. When two or more types of polyester-containing elastic material are mixed with each other, the mixing ratios of the plural polyester-containing elastic materials are not especially limited.

When these polyester-containing elastic materials include the polyvinyl resin (B) and/or the silane coupling agent (C) in addition to the polyester block copolymer (A), especially, these polyester-containing elastic materials may include the polyvinyl resin (B) and the silane coupling agent (C) in addition to the polyester block copolymer (A). In this case, the acquired aqueous dispersion can exhibit a better adhesion strength.

The polyvinyl resin (B) used in the present invention is not especially limited while, for example, a polyvinyl alcohol-type resin and, preferably, a polyvinyl butyral resin and a polyvinyl acetal resin are advantageously used. The polyvinyl resin (B) is a resin that is generally insoluble in water.

Of the polyvinyl resins (B), for example, the polyvinyl butyral resin is a resin that includes, for example, vinyl alcohol/vinyl acetate/vinyl butyral acquired by reacting polyvinyl alcohol and butylaldehyde, and is a resin that is usually insoluble in water.

Examples of a commercially available product of the polyvinyl resin (B) include, for example, S-LEC® BL-1, BX-L, BM-S, KS-3, and the like produced by Sekisui Chemical Co., Ltd., and Denkabutyal® 3000-1, 3000-2, 3000-4, 4000-2, and the like produced by Denka Co., Ltd. while the commercially available products thereof are not limited to these.

The blending amount of the polyvinyl resin (B) is usually 1 to 30 parts by mass and preferably 3 to 20 parts by mass relative to 100 parts by mass of the polyester block copolymer (A). The use of the polyvinyl resin (B) by the above blending amount can enhance the adhesion strength and also enhance the mechanical strength of the acquired polyester-containing elastic material.

The silane coupling agent (C) used in the present invention is not especially limited while, preferably, the silane coupling agent (C) is a silane coupling agent whose one molecule includes an amino group, an epoxy group, a vinyl group, an allyl group, a methacryl group, a sulfide group, or the like. Among these, a silane coupling agent whose one molecule includes an epoxy group is advantageously used. Specific examples of the silane coupling agent (C) include 3-aminopropyltrimethoxysilane, 3-aminopropylethoxysilane, 3-(2-aminoethyl)aminopropyltrimethoxysilane, 3-(2-aminoethyl)aminopropylmethyldimethoxysilane, 3-phenylaminopropyltrimethoxysilane, 3-glycidoxypropyltrimethoxysilane, 3-glycidoxypropyldimethoxysilane, 3-glycidoxypropyltriethoxysilane, 3-glycidoxypropylmethyldiethoxysilane, 2-(3,4-epoxycyclohexyl)ethyltrimethoxysilane, bis(3-(triethoxysilyl)propyl) disulfide, bis(3-(triethoxysilyl)propyl)tetrasulfide, vinyltriacetoxysilane, vinyltrimethoxysilane, vinyltriethoxysilane, acryloyltrimethoxysilane, 3-methacryloxypropyltrimethoxysilane, 3-methacryloxypropylmethyldimethoxysilane, 3-mercaptopropyltrimethoxysilane, and 3-mercaptopropylmethyldimethoxysilane and, preferably, the silane coupling agent (C) is an epoxy group-including compound. Each one of the above can be used alone, or two or more thereof can concurrently be used.

The blending amount of the silane coupling agent (C) of the present invention is usually 0.01 to 5.0 parts by mass, preferably 0.05 to 3.0 parts by mass, and more preferably 0.1 to 1.5 parts by mass relative to 100 parts by mass of the polyester block copolymer (A). The use of the silane coupling agent (C) by the above blending amount can improve the mechanical properties such as the adhesion strength and the tensile fracture stretch, can prevent generation of any glooming, and can provide a better thermal stability. In addition, the adhesion strength can further be improved.

A commercially available product may be used as the silane coupling agent (C) of the present invention. Examples of the commercially available product include, for example, Z-6040 and Z-6043 (that each are an epoxy group-including compound) produced by Dow Corning Toray Co., Ltd.

The method for mixing the polyester block copolymer (A), and the polyvinyl resin (B) and/or the silane coupling agent (C) with each other is not especially limited while, for example, a method or the like can properly be employed, according to which the polyester block copolymer (A), and the polyvinyl resin (B) and/or the silane coupling agent (C) are supplied to a screw extruder and are melted and kneaded with each other. The temperature for the melting and the kneading is not especially limited while, preferably, the content is heated to a temperature, for example, equal to or higher than 200° C.

Various additives may be added to the polyester-containing elastic material each within a range not to obstruct the objects of the present invention. Substances can arbitrarily be included as the additives, such as, for example, forming auxiliary agents such as a known crystal core agent and a lubricant, an oxidation inhibitor, weathering inhibitors such as an ultraviolet absorbing agent and a hindered amine-type compound, a hydrolysis-resistant improving agent, coloring agents such as a pigment and a dye, an antistatic agent, a conducting agent, a flame retarder, a strengthening agent, an inorganic filler, a bulking agent, a plasticizer, a mold release agent, and the like.

The polyester-containing elastic material in the aqueous dispersion of the present invention may be a material that means a mixture of, for example, the polyester block copolymer (A), and the polyvinyl resin (B) and/or the silane coupling agent (C). In this case, the aqueous dispersion of the present invention may include a macromolecule dispersion stabilizing agent described later, the above additives, and the like in addition to the polyester-containing elastic material and the non-ionic surface active agent.

The non-ionic surface active agent used in the present invention is not especially limited while the non-ionic surface active agent generally is soluble in water and has emulsion stabilizing power. Examples of the non-ionic surface active agent include, for example, polyvinyl alcohol, modified polyvinyl alcohol, polyethyleneglycol, an ethylene oxide/propylene oxide copolymer, polyoxyethylenealkyl ether, polyoxyethylenealkylphenyl ether, polyoxyethylenealkyl thioether, polyoxyethylenesorbitan fatty acid monoester, polyoxyethylenealkylamide, and polyglycerin ester. Among these, preferably, polyvinyl alcohol and the ethylene oxide/propylene oxide copolymer are used from the viewpoint that these substances each have emulsion stabilizing power and are each better in the heat resistance.

Polyvinyl alcohol used in the present invention as the non-ionic surface active agent is, for example, a copolymer including vinyl alcohol/vinyl acetate, and usually is soluble in water and has emulsion stabilizing power.

In the present invention, each of the non-ionic surface active agents may be used alone, or two or more thereof may concurrently be used.

Polyvinyl alcohol is, for example, a compound represented by a general formula (1) below.

[Ch. 1]

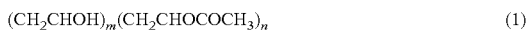

$$(CH_2CHOH)_m(CH_2CHOCOCH_3)_n \qquad (1)$$

In the general formula (1), "m" and "n" each represent the number of moles for addition and m represents an integer of 1 to 3,000 and n represents an integer of 1 to 1,000. These numbers may be equal to each other or may be different from each other.

The polymerization degree of polyvinyl alcohol is not especially limited while the polymerization degree thereof is, preferably 300 to 3,000 and more preferably 500 to 2,500.

The saponification degree of polyvinyl alcohol is not especially limited while the saponification degree thereof is, preferably 70 to 99% by mole and more preferably, 85 to 95% by mole.

The ethylene oxide/propylene oxide copolymer is, for example, a compound represented by a general formula (2) below.

[Ch. 2]

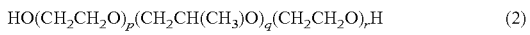

$$HO(CH_2CH_2O)_p(CH_2CH(CH_3)O)_q(CH_2CH_2O)_rH \qquad (2)$$

In the general formula (2), "p", "q", and "r" each represent the number of moles for addition and p represents an integer of 2 to 300, q represents an integer of 10 to 150, and r represents an integer of 2 to 300. These numbers may be equal to each other or may be different from each other.

The weight average molecular weight of the ethylene oxide/propylene oxide copolymer is not especially limited while the weight average molecular weight thereof is, for example, 3,000 to 30,000, preferably 6,000 to 25,000, and especially preferably 8,000 to 20,000. The content rate of ethylene oxide (a monomer unit originated from ethylene oxide) in the ethylene oxide/propylene oxide copolymer is not especially limited while the content rate thereof is, for example, 40 to 95% by mass, preferably 45 to 90% by mass, and especially preferably 50 to 85% by mass.

In the aqueous dispersion of the polyester-containing elastic material of the present invention, the use amount of the non-ionic surface active agent is 1 to 20 part(s) by mass and preferably 3 to 12 parts by mass relative to 100 parts by mass of the polyester-containing elastic material. The rate of the non-ionic surface active agent is equal to or larger than 1 part by mass, preferably equal to or larger than 3 parts by mass, and more preferably equal to or larger than 4 parts by mass relative to 100 parts by mass of the polyester-containing elastic material. The rate of the non-ionic surface active agent is equal to or smaller than 20 parts by mass, preferably equal to or smaller than 12 parts by mass, and more preferably equal to or smaller than 10 parts by mass relative to 100 parts by mass of the polyester-containing elastic material. As far as the rate of the non-ionic surface active agent is within the range of 1 to 20 part(s) by mass relative to 100 parts by mass of the polyester-containing elastic material, the rate of the non-ionic surface active agent can properly be set and, for example, any one of the above upper limit values and any one of the above lower limit values may be combined with each other. With the use of the non-ionic surface active agent at such blending amounts, a stable aqueous dispersion can be acquired, emulsification can easily be conducted, and the various physical properties imparted by the polyester-containing elastic material can be maintained in a molded article formed using the aqueous dispersion of the polyester-containing elastic material.

A non-ionic surface active agent that is solid at room temperature is advantageously used as the non-ionic surface active agent in the present invention and, preferably, a non-ionic surface active agent having a melting point equal to or higher than 50° C. is used. With this property, occurrence of any bleeding of the non-ionic surface active agent can be suppressed on the surface of a molded article and high adhesiveness for various types of material by the polyester-containing elastic material can be provided.

The aqueous dispersion of the polyester-containing elastic material of the present invention may include a macromolecule dispersion stabilizing agent such as an ethylene/ethylenically unsaturated carboxylic acid copolymer, an oxidized polyethylene wax, hydroxyethyl cellulose, methyl cellulose, hydroxypropyl cellulose, polyacrylate, a salt of a polyacrylic acid ester, or sodium alginate, when necessary, within a range not to obstruct the objects of the present invention. The use of these macromolecule dispersion stabilizing agents facilitates the emulsification and a stable aqueous dispersion whose dispersion has a smaller particle diameter can be acquired.

The use amount of the macromolecule dispersion stabilizing agent is not especially limited while the use amount thereof is, for example, 0.1 to 10 parts by mass and preferably 0.2 to 5 parts by mass relative to 100 parts by mass of the polyester-containing elastic material.

As to the aqueous dispersion of the polyester-containing elastic material of the present invention, the average particle diameter of the polyester-containing elastic material is, for example, 0.1 to 20 μm, preferably 0.2 to 15 μm, and more preferably 0.3 to 12 μm. Retaining the average particle diameter of the particle within the above ranges enhances the static stability of the aqueous dispersion and the viscosity suitable for handling, especially, the production of a molded article can be provided. Accordingly, a molded article better in the mechanical property can therefore be provided.

The average particle diameter is measured using a laser diffraction particle size distribution measurement method.

The shape of the particle is not especially limited while, preferably, a spherical particle is used. Examples of the spherical particle include, for example, an exact spherical particle, an ellipsoidal particle, and a bar-like spherical particle. Among these, especially preferably, the exact spherical particle is used. When the particles are spherical particles, the viscosity of the aqueous dispersion can be suppressed from becoming significantly high, as irregular-shaped particles having protrusions are few among the particles and the surface area of the particles can be set to be small.

The present invention also provides a method for producing the aqueous dispersion of a polyester-containing elastic material. The aqueous dispersion of the polyester-containing elastic material of the present invention can be produced using a method according to which the polyester-containing elastic material is emulsified and dispersed in an aqueous medium having the non-ionic surface active agent present therein. The aqueous dispersion of the polyester-containing elastic material of the present invention can be produced using, for example, a method as below.

The polyester-containing elastic material, the non-ionic surface active agent, and the aqueous medium are put in a reaction apparatus and a mixture liquid of these components is prepared. The order of putting the polyester-containing elastic material, the non-ionic surface active agent, and the aqueous medium in the reaction apparatus is not limited.

As described above, the rate of the non-ionic surface active agent relative to the polyester-containing elastic material is 1 to 20 parts by mass and preferably 3 to 12 parts by mass relative to 100 parts by mass of the polyester-containing elastic material. The rate of the non-ionic surface active agent is equal to or larger than 1 part by mass, preferably equal to or larger than 3 parts by mass, and more preferably equal to or larger than 4 parts by mass relative to 100 parts by mass of the polyester-containing elastic material. The rate of the non-ionic surface active agent is equal to or smaller than 20 parts by mass, preferably equal to or smaller than 12 parts by mass, and more preferably equal to or smaller than 10 parts by mass relative to 100 parts by mass of the polyester-containing elastic material. As far as the rate of the non-ionic surface active agent is in the range of 1 to 20 parts by mass relative to 100 parts by mass of the polyester-containing elastic material, the rate of the non-ionic surface active agent can properly be set and, for example, any one of the above upper limit values and any one of the above lower limit values may be combined with each other. With the use of the non-ionic surface active agent at such blending amounts, a stable aqueous dispersion can be acquired, emulsification can easily be conducted, and the various physical properties imparted by the polyester-containing elastic material can be maintained in a molded article formed using the aqueous dispersion of the polyester-containing elastic material.

The use amount of the aqueous medium is not especially limited while the use amount thereof is set to be, for example, 10 to 1,000 parts by mass and is set to be, preferably 10 to 250 parts by mass relative to 100 parts by mass of the polyester-containing elastic material. The use of the aqueous medium in the ranges enables acquisition of an aqueous dispersion that is better in the dispersion stability and the like. The aqueous dispersion can be acquired that is also better in the productivity and the practical usability.

As the apparatus used in the preparation and the emulsification of the mixture liquid, an apparatus including, for example, a heating means capable of heating the content to a temperature equal to or higher than the temperature at which the polyester-containing elastic material melts or to a temperature lower than the melting point of the polyester-containing elastic material, and a stirring means capable of applying a shear strength to the mixture liquid is preferably used. Preferably, for example, a pressure-resistant autoclave with a stirrer, a two-screw extruder, a kneader, or the like is used.

The mixture liquid is then heated to the temperature equal to or higher than the temperature at which the polyester-containing elastic material melts or to the temperature lower than the melting point of the polyester-containing elastic material, and is stirred to emulsify the mixture liquid. When an emulsion liquid acquired thereby is cooled to room temperature, the aimed aqueous dispersion of the polyester-containing elastic material is acquired. The method for heating the polyester-containing elastic material is not especially limited and the polyester-containing elastic material can be heated by applying a strong mechanical shear strength thereto, in addition to the heating using a heater or the like. The heating temperature is not especially limited while the polyester-containing elastic material is emulsified at, for example, a temperature between a temperature lower by 40° C. than the melting point of the polyester-containing elastic material and a temperature higher by 100° C. than the melting point from the point that the thermal history applied to the polyester-containing elastic material is reduced. Preferably, the polyester-containing elastic material is emulsified at a temperature between a temperature lower by 30° C. than the melting point of the polyester-containing elastic material and a temperature higher by 60° C. than the melting point. For example, the emulsification of the polyester-containing elastic material is conducted at a temperature in a range of, for example, 65° C. to 325° C.

In the present invention, especially, when the emulsification is conducted at a temperature lower than the melting point, any decomposition of the polyester-containing elastic material due to the thermal history can be suppressed.

The number of rotations, the stirring time period, the temperature, and the like during the stirring are properly adjusted to be set at values with which the average particle diameter of the polyester-containing elastic material is set to be in, for example, a range of 0.1 to 20 µm. The average particle diameter of the polyester-containing elastic material can also be set to be the value in the above range by selection of the non-ionic surface active agent and adjustment of the use amount thereof in addition to the adjustment of the number of rotations of the stirrer, the stirring time period, and the like.

When the aqueous dispersion of the polyester-containing elastic material including the macromolecule dispersion stabilizing agent is prepared, the method for adding the macromolecule dispersion stabilizing agent is not especially limited and, for example, the macromolecule dispersion stabilizing agent may be added to the mixture liquid when the mixture liquid of the polyester-containing elastic material, the non-ionic surface active agent, and the aqueous medium is prepared, or the macromolecule dispersion stabilizing agent may be added to the emulsion liquid that is cooled to room temperature.

The aqueous dispersion of the polyester-containing elastic material of the present invention may be used to produce a molded article. The aqueous dispersion of the polyester-containing elastic material of the present invention has the better static stability and the better molding processability, and is therefore useful as a material for producing various types of molded article.

The method for producing the molded article is not especially limited while the method therefor includes, for example, a step of applying the aqueous dispersion of the polyester-containing elastic material of the present invention to a base material or pouring the aqueous dispersion thereof into a mold form, and a step of drying (that is, removing the moisture of) the applied or the poured aqueous dispersion of the polyester-containing elastic material. The method for producing the molded article including these steps enables acquisition of molded articles in various types of form such as a coating film, a film, or a sheet that includes the non-ionic surface active agent and the polyester-containing elastic material.

The base material used in the production of the molded article is not especially limited while, for example, the base material is produced from each of a metal such as aluminum or copper, glass, a woody material, a rubber, a thermoplastic resin, a thermosetting resin, resins formed by reinforcing these resins using a reinforcement fiber or a filler, and the like. The thickness and the shape of the base material are not especially limited.

The method for applying the aqueous dispersion of the polyester-containing elastic material of the present invention to the base material is not especially limited while the method include, for example, a method for applying the aqueous dispersion thereof using a brush, a paddle, a roller, a caulk gun, or the like, and a method for applying the aqueous dispersion thereof using an air spray, a nozzle spray, a roll coater, a bead, or the like.

The application amount of the aqueous dispersion of the polyester-containing elastic material to the base material is properly set corresponding to the purpose and, for example, the aqueous dispersion of the polyester-containing elastic material of the present invention is applied for the thickness thereof to be 0.001 mm to 5 mm.

The method for pouring the aqueous dispersion of the polyester-containing elastic material into the mold form is not especially limited.

The moisture is removed after the aqueous dispersion of the polyester-containing elastic material is applied to the base material or is poured into the mold form. The drying temperature at the step of removing the moisture is not especially limited while the drying temperature is usually set to be 40 to 300° C.

The drying time period is not especially limited and the drying time period is, for example, 0.2 to 2 hours when the drying is conducted at 100° C.

The side to which the aqueous dispersion of the polyester-containing elastic material is applied, of the molded article acquired as above (the molded article acquired by applying the aqueous dispersion of the polyester-containing elastic material to the base material and drying the aqueous dispersion) and another base material are overlapped then are, for example, pressured at 0.1 to 100 MPa when necessary at 120 to 300° C. using a hot press to be heated for 1 to 500 sec. The molded article including the base materials bonded to each other in layers can thereby be produced. The base materials bonded to each other may be different types of base material from each other or may be of same type as that of each other.

The aqueous dispersion of the polyester-containing elastic material of the present invention is better in the compatibility between the non-ionic surface active agent and the polyester-containing elastic material, and the bleeding of the non-ionic surface active agent is not therefore substantially recognized for the molded article acquired as above and the various properties essentially retained by the polyester-containing elastic material, that is, the adhesiveness for different types of material, the heat resistance, the oil resistance, the impact strength, the tensile strength, the vibration damping property, the flexibility, the low temperature property, and the bending property are not degraded.

Thus, the aqueous dispersion of the polyester-containing elastic material of the present invention can be used in a wide range of usages such as a material for producing car parts, sport-related products, medical tools, and the like; a coating agent for paper, a film, and the like; a material for a foam rubber; a convergence agent for fiber materials such as a synthetic fiber, a natural fiber, a glass fiber, a carbon fiber, and the like; surface preparation agents (a thermal adhesive and an RFL treating agent) and a coating agent; or a material for producing a hose, a tube, a belt, a gasket, a packing, and the like; a sealing agent for connectors and sensors; and a material for producing electric and electronic parts such as a thermal adhesive, a cord covering and an antenna cover.

EXAMPLES

The polyester-containing elastic materials described below were used.
(P-1) Hytrel 4057N produced by Du Pont-Toray Co., Ltd., (melting point: 163° C.)
(P-2) The polyester block copolymer (A): 89.5% by mass of Hytrel 4057N,
the polyvinyl resin (B): 10% by mass of S-LEC BX-L, polyvinylacetal produced by Sekisui Chemical Co., Ltd., and
the silane coupling agent (C): 0.5% by mass of Z-6040 produced by Dow Corning Toray Co., Ltd., were dry-blended, and were melted and kneaded using a two-screw extruder at a temperature set to be 210° C. to be thereafter pelletized (the melting point: 163° C.).
(P-3) The polyester block copolymer (A): 89.5% by mass of Hytrel 2300X06 (the melting point: 142° C.), the polyvinyl resin (B): 10% by mass of S-LEC BL-1, polyvinylbutyral produced by Sekisui Chemical Co., Ltd., and
the silane coupling agent (C): 0.5% by mass of Z6043 produced by Dow Corning Toray Co., Ltd., were dry-blended, and were melted and kneaded using a two-screw extruder at a temperature set to be 200° C. to be thereafter pelletized (the melting point: 142° C.).

Example 1

160 g of the polyester-containing elastic material (P-1), 221 g of deionized water, and 19 g of an ethylene oxide/propylene oxide copolymer (a product with a name "Pluronic F108" from Asahi Denka K.K.: whose weight average molecular weight was 15,500 and whose content of ethylene oxide was 80% by mass) were put in a 1-liter pressure-resistant autoclave equipped with a 50-mm diameter turbine-type stirring blade, and the autoclave was hermetically closed. The stirrer was started up to maintain stirring at the number of rotations of 500 rpm, increasing the temperature of the inside of the autoclave to 180° C. The stirring was further continued for 15 minutes maintaining the internal temperature at 180° C. and the content was thereafter cooled to room temperature to acquire an aqueous dispersion of the polyester-containing elastic material.

Example 2

The temperature of a barrel having a diameter of 15 mm of a two-screw extruder (L/D=60) was set to be 140° C. and the number of rotations of a stirrer was set to be 750 rpm. Continuous supply was conducted setting the flow of the polyester-containing elastic material (P-2) to be 1.0 kg/hr, the flow of deionized water to be 1.4 kg/hr, and the flow of an ethylene oxide/propylene oxide copolymer (a product with a name "Pluronic F108" from Asahi Denka K.K.: whose weight average molecular weight was 15,500 and whose content of ethylene oxide was 80% by mass) to be 0.05 kg/hr. The contents were stirred and were thereafter cooled to acquire an aqueous dispersion of the polyester-containing elastic material.

Example 3

The temperature of a barrel having a diameter of 15 mm of a two-screw extruder (L/D=60) was set to be 140° C. and the number of rotations of a stirrer was set to be 750 rpm. Continuous supply was conducted setting the flow of the polyester-containing elastic material (P-2) to be 1.0 kg/hr, the flow of deionized water to be 1.4 kg/hr, the flow of an ethylene oxide/propylene oxide copolymer (a product with a name "Pluronic F108" from Asahi Denka K.K.: whose weight average molecular weight was 15,500 and whose content of ethylene oxide was 80% by mass) to be 0.05 kg/hr, and the flow of an ethylene acrylic acid copolymer to be 0.05 kg/hr. The contents were stirred and were thereafter cooled to acquire an aqueous dispersion of the polyester-containing elastic material.

Example 4

The temperature of a barrel having a diameter of 15 mm of a two-screw extruder (L/D=60) was set to be 140° C. and the number of rotations of a stirrer was set to be 750 rpm. Continuous supply was conducted setting the flow of the polyester-containing elastic material (P-2) to be 1.0 kg/hr, the flow of deionized water to be 1.4 kg/hr, and the flow of polyvinyl alcohol (a product with a name "Poval PVA420" from Kuraray Co., Ltd.) to be 0.07 kg/hr. The contents were stirred and were thereafter cooled to acquire an aqueous dispersion of the polyester-containing elastic material.

Example 5

An aqueous dispersion of a polyester-containing elastic material was acquired by conducting the same operations as those of Example 4 except that the polyester-containing elastic material (P-3) was used instead of the polyester-containing elastic material (P-2) and the temperature of the barrel was set to be 130° C. in Example 4.

Example 6

An aqueous dispersion of the polyester-containing elastic material was acquired by conducting the same operations as those of Example 1 except that the polyester-containing elastic material (P-2) was used instead of the polyester-containing elastic material (P-1) in Example 1.

Example 7

160 g of the polyester-containing elastic material (P-2), 213 g of deionized water, 19 g of an ethylene oxide/propylene oxide copolymer (a product with a name "Pluronic F108" from Asahi Denka K.K.: whose weight average molecular weight was 15,500 and whose content of ethylene oxide was 80% by mass), and 8 g of an ethylene acrylic acid copolymer were put in a 1-liter pressure-resistant autoclave equipped with a 50-mm diameter turbine-type stirring blade, and the autoclave was hermetically closed. The stirrer was started up to maintain stirring at the number of rotations of 500 rpm, increasing the temperature of the inside of the autoclave to 180° C. The stirring was further continued for 15 minutes maintaining the internal temperature at 180° C. and the content was thereafter cooled to room temperature to acquire an aqueous dispersion of the polyester-containing elastic material.

Comparative Example 1

The same operations were conducted as those of Example 1 except that 1 g of an ethylene oxide/propylene oxide copolymer (a product with a name "Pluronic F108" from Asahi Denka K.K.: whose weight average molecular weight was 15,500 and whose content of ethylene oxide was 80% by mass) was used as the non-ionic surface active agent. The polyester-containing elastic material in the acquired product was, however, a block material and no aqueous dispersion was able to be acquired.

Comparative Example 2

The same operations were conducted as those of Example 1 except that 40 g of an ethylene oxide/propylene oxide copolymer (a product with a name "Pluronic F108" from Asahi Denka K.K.: whose weight average molecular weight was 15,500 and whose content of ethylene oxide was 80% by mass) was used as the non-ionic surface active agent, to acquire an aqueous dispersion of the polyester-containing elastic material.

Comparative Example 3

The same operations were conducted as those of Example 4 except that the temperature of the barrel was set to be 110° C. in Example 4. The polyester-containing elastic material in the acquired product was, however, a block material and no aqueous dispersion was able to be acquired.

Comparative Example 4

The same operations were conducted as those of Example 4 except that the temperature of the barrel was set to be 270° C. in Example 4. The liquid at the exit of the two-screw extruder gushed out and no aqueous dispersion was able to be acquired.

Evaluation

The average particle diameter was measured for each of the aqueous dispersions acquired in Examples 1 to 7 and Comparative Example 2, and the adhesiveness was evaluated for a molded article acquired from each of these aqueous dispersions. The methods for measuring the items and the methods for evaluating the items are as follows. The result is shown in Table 1.

(Average Particle Diameter)

The average particle diameter was measured using a laser diffraction particle size distribution measuring apparatus (a product with a name "SALD-2000J" manufactured by Shimadzu Corporation).

(Bleeding)

The state of bleeding of the non-ionic surface active agent was evaluated by visual observation according to the following criteria for a coating film acquired in the evaluation of the adhesiveness.

O: The non-ionic surface active agent did not bleed from the surface of the coating film.

x: A small amount of the non-ionic surface active agent bled from the surface of the coating film.

(Adhesiveness)

Each of the aqueous dispersions acquired in Examples 1 to 7 and Comparative Example 2 was applied to the surface of an aluminum plate (A5052) (whose emulsion thickness was about 0.25 mm) and was thereafter dried for 1 hour at 100° C. An unprocessed aluminum plate and the side having the emulsion applied thereon were faced to and put on each other, were heated for 15 seconds at 200° C. and 2 MPa using a hot press (whose adhesion area was 20 mm×10 mm), and were cooled. A tensile shear test was thereafter conducted for the cooled plates under the condition of a tension rate of 50 mm/min using an autograph (a product with a name "AGS-J" from Shimadzu Corporation). As a result, the tensile shear strength of each of the test pieces that used the aqueous dispersions acquired in Examples 1 to 7 was equal to or higher than 2 MPa. It can therefore be stated that the aqueous dispersions acquired in Examples 1 to 7 were better in the adhesiveness.

TABLE 1

|  | Average Particle Diameter (μm) | Bleeding | Tensile Shear Strength (MPa) |
|---|---|---|---|
| Example 1 | 7.0 | ○ | 2.1 |
| Example 2 | 10.9 | ○ | 5.9 |
| Example 3 | 5.4 | ○ | 4.8 |
| Example 4 | 4.0 | ○ | 9.1 |
| Example 5 | 2.7 | ○ | 5.9 |
| Example 6 | 10.9 | ○ | 5.5 |
| Example 7 | 5.4 | ○ | 4.8 |
| Comparative Example 2 | 4.0 | x | 1.0 |

It can be seen from Table 1 that the molded articles acquired from the aqueous dispersions of the polyester-containing elastic materials acquired in Examples 1 to 7 each had no bleeding observation of the non-ionic surface active agent and were each better in the adhesiveness. On the other hand, the molded article acquired from the aqueous dispersion of the polyester-containing elastic material acquired in Comparative Example 2, as a result, had the bleeding of the non-ionic surface active agent and had low adhesiveness.

The invention claimed is:

1. An aqueous dispersion of a polyester-containing elastic material, comprising:
   an aqueous medium;
   a non-ionic surface active agent; and
   a polyester-containing elastic material, wherein
   the aqueous dispersion comprises 1 to 20 parts by mass of the non-ionic surface active agent relative to 100 parts by mass of the polyester-containing elastic material, wherein
   the polyester-containing elastic material comprises:
      a polyester block copolymer (A);
      a polyvinyl resin (B); and
      a silane coupling agent (C), and wherein
   the polyester-containing elastic material comprises 1 to 30 part(s) by mass of the polyvinyl resin (B) and 0.01 to 5.0 part(s) by mass of the silane coupling agent (C) relative to 100 parts by mass of the polyester block copolymer (A).

2. The aqueous dispersion of a polyester-containing elastic material according to claim 1, wherein
   the non-ionic surface active agent is at least one selected from a group consisting of polyvinyl alcohol, an ethylene oxide/propylene oxide copolymer, and a mixture of these.

3. The aqueous dispersion of a polyester-containing elastic material according to claim 1, wherein
   the polyester block copolymer (A) comprises:
      a hard segment (a1); and
      a soft segment (a2), and wherein
   the hard segment (a1) comprises:
      a polybutylene terephthalate unit that is derived from terephthalic acid and/or dimethyl terephthalate, and 1,4-butanediol; and
      a polybutylene isophthalate unit that is derived from isophthalic acid and/or dimethyl isophthalate, and 1,4-butanediol.

4. The aqueous dispersion of a polyester-containing elastic material according to claim 1, further comprising
   a macromolecule dispersion stabilizing agent.

5. The aqueous dispersion of a polyester-containing elastic material according to claim 1, wherein
   an average particle diameter of the polyester-containing elastic material is 0.1 to 20 μm.

6. A molded article produced using the aqueous dispersion of a polyester-containing elastic material according to claim 1.

7. A method for producing an aqueous dispersion of polyester-containing elastic material comprising:
   a step of preparing a mixture liquid of a polyester-containing elastic material, a non-ionic surface active agent, and an aqueous medium; and
   a step of emulsifying the polyester-containing elastic material with setting a temperature of the mixture liquid to be a temperature between a temperature lower by 40° C. than a melting point of the polyester-containing elastic material and a temperature higher by 100° C. than the melting point, wherein
   the method uses 1 to 20 parts by mass of the non-ionic surface active agent relative to 100 parts by mass of the polyester-containing elastic material wherein
   the polyester-containing elastic material comprises:
      a polyester block copolymer (A);
      a polyvinyl resin (B); and
      a silane coupling agent (C), and wherein
   the polyester-containing elastic material comprises 1 to 30 part(s) by mass of the polyvinyl resin (B) and 0.01 to 5.0 part(s) by mass of the silane coupling agent (C) relative to 100 parts by mass of the polyester block copolymer (A).

8. A molded article acquired from the aqueous dispersion of a polyester-containing elastic material produced according to the method for producing according to claim 7.

9. A method for producing a molded article comprising:
   a step of applying the aqueous dispersion of a polyester-containing elastic material according to claim 1 to a base material or pouring the aqueous dispersion thereof into a mold form; and
   a step of drying the applied or the poured aqueous dispersion of a polyester-containing elastic material.

* * * * *